United States Patent [19]

Porcello et al.

[11] Patent Number: 4,834,991
[45] Date of Patent: * May 30, 1989

[54] SOYBEAN OIL FILLER CREAM COMPOSITIONS

[75] Inventors: Samuel J. Porcello, Toms River; James M. Manns, Glenwood, both of N.J.; Kenneth W. Player, Dublin, Ohio; Lonny L. Wilson, Antioch, Ill.

[73] Assignee: Nabisco Brands, Inc., Parsippany, N.J.

[*] Notice: The portion of the term of this patent subsequent to Jun. 28, 2005 has been disclaimed.

[21] Appl. No.: 775,803

[22] Filed: Sep. 13, 1985

Related U.S. Application Data

[63] Continuation-in-part of Ser. No. 744,362, Jun. 13, 1985, Pat. No. 4,753,812.

[51] Int. Cl.$^4$ .......................... A23D 5/00; A23G 3/00
[52] U.S. Cl. ........................................ 426/94; 426/103; 426/549; 426/572; 426/601; 426/613; 426/607
[58] Field of Search .................. 426/94, 103, 549, 572, 426/601, 613, 607

[56] References Cited

U.S. PATENT DOCUMENTS

| Re. 31,754 | 12/1984 | Miller et al. | 426/604 X |
|---|---|---|---|
| 2,359,228 | 9/1944 | Lloyd et al. | 426/659 X |
| 3,199,988 | 8/1965 | Kozlik et al. | 426/572 |
| 3,244,536 | 4/1966 | Kidger | 426/572 X |
| 3,600,196 | 8/1981 | Heine | . |
| 3,751,265 | 8/1973 | Seiden | 426/572 X |
| 3,914,453 | 10/1975 | Gawrilo | 426/553 |
| 3,949,105 | 4/1976 | Wieske et al. | 426/607 |
| 4,081,559 | 3/1978 | Jeffery et al. | 426/103 |
| 4,120,987 | 10/1978 | Moore | 426/572 |
| 4,146,652 | 3/1979 | Kahn et al. | 426/564 |
| 4,209,536 | 6/1980 | Dogliotti | 426/94 |
| 4,214,012 | 7/1980 | Ainger et al. | 426/607 |
| 4,310,557 | 1/1983 | Suggs et al. | 426/96 |
| 4,350,715 | 9/1982 | Rek | 426/570 |
| 4,379,176 | 4/1983 | Scherwitz et al. | 426/623 |
| 4,384,008 | 5/1983 | Millsor | 426/613 |
| 4,388,339 | 6/1983 | Lomneth et al. | 426/602 |
| 4,390,561 | 6/1983 | Blair et al. | 426/607 |
| 4,394,392 | 7/1983 | Tresser | 426/101 |
| 4,410,552 | 10/1983 | Gaffeny et al. | 426/103 |
| 4,410,557 | 10/1983 | Miller | 426/607 |
| 4,431,682 | 2/1984 | Smith et al. | 426/565 |
| 4,447,462 | 5/1984 | Tafuri et al. | 426/601 |
| 4,524,086 | 6/1985 | Player et al. | 426/607 |
| 4,610,884 | 9/1986 | Lewis, III et al. | 426/103 |
| 4,664,921 | 5/1987 | Seiden | 426/94 |

FOREIGN PATENT DOCUMENTS

| 72212 | 2/1983 | European Pat. Off. | 426/ |
|---|---|---|---|
| 2609998 | 9/1977 | Fed. Rep. of Germany | 426/659 |
| 2403746 | 9/1978 | France | . |
| 56638 | 4/1983 | Japan | 426/660 |
| 1013372 | 12/1965 | United Kingdom | . |
| 1080998 | 8/1967 | United Kingdom | . |

OTHER PUBLICATIONS

Weiss, Theodore J., Ph.D. "Food Oils and Their Uses", 1983, AVI Publishing Co., Inc. Westport, Conn., pp. 76-81.

Weiss, Food Oils and Their Uses, The AVI Publishing Co., 2nd ed., pp. 12-17 and 154 (1983).

Primary Examiner—Jeanette Hunter
Attorney, Agent, or Firm—Richard Kornutik

[57] ABSTRACT

A filler cream containing soybean oil is disclosed which has an improved "get away" property resulting in a rapid burst of flavor when consumed. The filler cream ingredients are mixed, aerated, and cooled simultaneously to obtain a specific gravity of between about 0.85 and about 1.20. The resulting filler cream is utilized as a filler for sandwich cookies or other baked goods.

11 Claims, No Drawings

SOYBEAN OIL FILLER CREAM COMPOSITIONS

This application is a continuation-in-part of U.S. application Ser. No. 744,362 filed June 13, 1985, now U.S. Pat. No. 4,753,812.

FIELD OF THE INVENTION

This invention relates to filler creams for baked products, methods for making the filler creams, and to products containing the filler creams.

BACKGROUND OF THE INVENTION

Filler creams have been used in baked goods and other foods in a variety of ways. The common use is to insert a filler cream into a baked pastry by injection. Another common method is to use a filler cream as a laminate or "sandwich" material between two cookie base cakes.

Filler cream compositions are generally comprised of sucrose or sucrose in combination with other sugars, flavorings, and oils or fats. Variations of the ingredients of a filler cream composition can lead to significantly different properties in a filler cream. Sugar combinations can cause a filler cream to be too sweet for eating in large quantities or, if artificial sweeteners are used, the filler cream can be too bitter for consumer acceptance.

The oil or fat used in filler creams can be a single oil or fat or a mixture of oils or fats. For purposes of this invention any oil or fat or mixture thereof used in a filler composition is identified by the term "oleaginous composition". Desirable oleaginous compositions used in filler creams for sandwich cookies are firm, but soft or "spreadable" at ordinary storage temperatures. Desirable oleaginous compositions must have good whipping and creaming properties that develop a filler cream with a light, consistent texture during whipping and aeration process steps. Also, desirable oleaginous compositions have a palatable flavor with little or no after taste and produce a filler cream that dissolves rapidly at body temperature when consumed. Oleaginous compositions used in commercial filler creams must have good shelf storage properties.

It is desirable for a filler cream to have a short "plastic range" in which there is a high solid fat content at low temperatures and approximately no solid fat content above body temperature. The term, plastic range, refers to the temperature range in which a filler cream fat or oleaginous composition is neither completely solid nor completely liquid. In this range the filler cream fat is pliable, but not completely fluid. A typical filler cream is manufactured from a soybean oil based oleaginous composition and sugar.

The whipping or aerating qualities of an oleaginous composition refer to the ability of that oleaginous composition to hold air incorporated into it. Air is sparged into the oleaginous composition as it is mixed at a temperature of about 95 degrees F. The air is desirably retained by the filler cream at room temperature for several months. Desirable whipping or aerating qualities in an oleaginous composition produce a filler cream that is "light" on the plate when consumed. Light characteristics of a filler cream are best understood by comparing a whipped cream product to a solid fat product such as margarine. A solid fat product melts slowly on the tongue and leaves an oleaginous coating. A whipped cream product dissolves rapidly and leaves little or no oily after taste. Aeration also controls firmness of the filler cream. Generally, increasing the aeration of a filler cream increases its softness.

The characteristics of an oleaginous composition can be altered without changing the source of the oils or fats in the composition. This is done by altering the amount of hydrogenation of the oils, the ratio of various oils to one another in the composition, and the amount of fractionation of the oils. Increased hydrogenation or fractionation usually imparts greater plasticity to an oleaginous composition. A reference detailing the properties of various food oils is Weis, *Food Oils And Their Uses*, The AVI Publishing Company (2d ed. 1983).

Filler cream compositions known in the art of producing cookies are usually made from inexpensive oils or fats such as soybean oil and are processed so as to achieve a stiff filler cream, which can be applied to base cakes of cookies without the use of high temperature. These filler creams are then quickly solidifed in cooliing apparatuses and remain solid and firm throughout three months or more of storage. Good storage or shelf stability characteristics are frequently achieved in a filler cream at the sacrifice of desirable mouth feel characteristics. As a result traditional filler creams made from inexpensive oils or fats and used in sandwich cookies leave an oily or waxy after taste and remain firm and partially solid at body temperature.

The shelf life of a filler cream can be improved by incorporating antioxidants into the oleaginous composition. Antioxidants prevent the development of undesirable flavors and odors associated with rancidity of fats or oils present in the filler cream. A three to nine month shelf life is desirable for commercial filler creams. Desirable shelf life or stability characteristics include resistance to structural, microbial, flavor, and color degradation.

U.S. Pat. No. 3,244,536 to Kidger discloses a process for making a traditional filler cream used in sandwich cookies. The oleaginous composition used in this invention contains two components. The first component is a commercially hydrogenated fat with a high content of $C_{18}$ fatty acids. The second component, which is a vegetable oil containing component, has a high proportion of lauric acid. These two components are blended and subjected to interesterification. Any animal fats or vegetable oils can be used as the first component for this invention. Tallow and lard are preferred for use as the second component. The vegetable oils used for the first component are identified in the various embodiments as coconut oil and palm kernel oil.

U.S. Pat. No. 2,359,228 to Lloyd et al. discloses a filler cream which has good storage properties that are achieved by incorporating dried starch conversion syrup solids into the cream. The substitution of dextrose with dry corn syrup stabilizes the moisture content within the final cookie product without producing a "gritty" filler cream.

U.S. Pat. No. 4,410,552 to Gaffeny et al. discloses an example of a filler cream. In this patent the filler cream is used for chocolate candies in which the oleaginous composition is altered to improve and enhance "mouth feel". The materials used in this invention are a combination of fats, sugars, water, and colloid substances. This combination is mixed and whipped together into a semi-plastic mass. The cream filler that is obtained, it is taught, does not have a texture which is either sticky or fatty-like.

U.S. Pat. No. 4,310,557 to Suggs et al. discloses food emulsifiers which are useful in producing filler creams and other products. The emulsifiers can produce products that are light in texture.

The present invention provides an inexpensive filler cream suitable for use with sandwich cookies and other foods that remains firm during storage, has a creamy, non-gritty texture and quick "get away" characteristics when consumed. As used herein "get away" characteristics means the perception of rate of dissolution of the filler cream in the mouth. A filler cream with "quick get away" characteristics is one which is perceived by an expert taste panel as dissolving, melting, changing from solid to liquid, or disappearing quickly or rapidly in the mouth, without a waxy or oily after taste. In the filler creams of the present invention, an oleaginous composition which changes from a firm texture to a liquid within a narrow temperature range and which is essentially completely liquid at body or mouth temperatures quickens the get away characteristics of the filler cream.

SUMMARY OF THE INVENTION

The filler cream of this invention has a soybean oil containing oleaginous composition mixed with sugar and preferably a flavoring. The oleaginous composition has a solid fat index of from about 26 to about 33 percent solid material at 70 degrees F. and from about 0.0 to about 5.0 percent solid material at 92 degrees F. The ingredients are aerated and mixed to produce a composition which has a specific gravity of between about 0.85 to about 1.20, and most preferably the specific gravity is between about 0.85 and about 0.95. This filler cream has enhanced quick get away properties. These properties are such that the filler cream has a high solids content at normal storage temperatures to provide a firm texture, but melts rapidly during consumption upon contact with the tongue. The rapid melting of the oil composition enables the sugar and any flavoring ingredients to quickly coat the tongue giving a rapid flavor sensation.

DETAILED DESCRIPTION OF THE INVENTION

The filler cream of this invention has a soybean oil containing oleaginous composition having a solid fat index of from about 26 to about 33 percent solid material at 70 degrees F. and up to about 5 percent solid material at 92 degrees F. This filler cream also has a sugar mixed into the oleaginous composition. The filler cream of this invention has a specific gravity between about 0.85 and about 1.20. The oleaginous composition of this invention is a mixture of soybean oil with one or more other oils or fats. The sugar used is typically sucrose, but can be a combination of sucrose with other sugars including fructose, dextrose, lactose, and mixtures thereof. The specific gravity of the filler cream is achieved by aeration or whipping processes using equipment which is standard in the art.

The filler cream of this invention remains firm at room temperatures but has a quick get away property upon consumption. This property causes the consumer to realize a quick burst of sweetness and flavoring when the filler cream melts on the consumer's tongue.

The filler cream of this invention can be prepared by first heating the oleaginous composition to between about 105 degrees F. and about 120 degrees F. Flavorings and any non-sugar ingredients, such as non-fat dry milk powder, are added to the heated oleaginous composition. Sugar is then added to this mixture. The sugar is not dissolved in the oleaginous composition, but is added with mixing to form a suspension.

The mixture of oil, sugar, and miscellaneous ingredients are aerated and mixed simultaneously. As the air sparging or aeration step begins, the temperature of the mixture is reduced to below about 78 degrees F. typically below 75° F. The reduction in temperature of the mixture occurs within approximately 5 minutes and is best performed in a mixing machine having three or more distinct temperature reduction zones. Such mixing machines, by reducing the temperature of the mixture of filler cream composition, produce a high concentration of beta-prime fat crystals in the filler cream. Beta-prime fat crystals impart stable aerating properties to a filler cream.

The step of air sparging, which includes mixing and cooling the filler cream composition, is critical to producing a filler cream with the desired properties of this invention. The addition of sugar and the other ingredients to the heated oleaginous composition lowers the temperature of the "slurry" or filler cream composition to between 95 degrees F. and 100 degrees F. At this temperature the filler cream composition has a specific gravity of between approximately 1.20 to approximately 1.25. Upon air sparging and rapid mixing of the slurry a filler cream specific gravity of between about 0.85 to about 1.20 is obtained. The most desirable specific gravity for the filler is between 0.85 and 0.95. A high concentration of air in the filler cream gives the filler cream a light "feel" or sensation on the tongue during consumption.

The solid fat index of the oleaginous composition is critical to achieving the properties required for a soybean oil containing filler cream according to this invention. The solid fat index of the oleaginous composition is most critical between storage temperatures of about 70 degrees F. and body temperature of about 92 degrees F. An oleaginous composition for use in this invention has a solid fat index within the ranges presented in Table I.

TABLE I

| | SOLID FAT INDEX | | |
| --- | --- | --- | --- |
| | % Solid Range | | |
| Degrees F. | minimum | | maximum |
| 50 | 46 | to | 52 |
| 70 | 26 | to | 33 |
| 80 | 9 | to | 15 |
| 92 | 0.0 | to | 5.0 |
| 104 | 0.0 | to | 0.0 |

Oleaginous compositions having a solid fat index within the above ranges produce a filler cream with improved quick get away properties when compared to conventional sobyean oil containing filler creams. Filler creams according to this invention also remain firm at storage temperatures.

Oleaginous compositions containing mixtures of sobyean oil and one or more other oils and having a solid fat index according to the above ranges can be obtained from numerous sources. Suitable oleaginous compositions can have numerous mixtures of either fractionated or unfractionated oils and oils having various degrees of hydrogenation.

The preferred oleaginous composition is a combination of two oils each of which is partially hydrogenated, fractionated, and interesterified. These oils are:

TABLE II

| PREFERRED OLEAGINOUS COMPOSITION | |
| --- | --- |
| Oil | % By Weight |
| Palm Kernel | 45 to 55 |
| Soybean | 55 to 45 |

The decreased concentration of soybean oil in this invention when compared to conventional filler cream, decreases the "waxy" mouth feel experienced with conventional soybean oil containing filler creams.

Alternative embodiments include oleaginous compositions in similar ratios to that listed in Table II, but substituting palm oil, cotton seed oil, or coconut oil or mixtures thereof in whole or in part for the palm kernel oil or soybean oil. Complete replacement of the soybean oil is not preferred because of the higher costs of other oils. The inclusion of palm oil, cotton seed oil, coconut oil, or other edible oils can affect the organoleptic qualities of the filler cream without greatly varying the quick get away properties.

Alternative embodiments of this invention can include an oleaginous composition in combination with an emulsifier. For example, polyglycerol esters in combination with soybean oil and palm kernel oil are useful in producing a smooth filler cream with a quick get away. Generally, the emulsifiers assist in the incorporation of sugar and other ingredients into an oleaginous composition.

Filler cream composition containing less than about 40 percent by weight oleaginous composition and more than about 60 percent by weight sugar, based upon the total weight of the sugar and oleaginous composition are preferred because of: (1) the relatively higher cost of the oleaginous composition and (2) the risk of melting of the oleaginous composition during adverse summertime storage and transportation temperatures. If any of the oleaginous composition melts, there would be more sugar available to be coated to retain the oil and to retain the structure of the filler cream and baked good.

However, as the weight percent of the oleaginous composition decreases, the filler is generally perceived as less creamier and more gritty as the particle size of the sugar increases. To provide a creamy, non-gritty texture, at low weight percentages of oleaginous compositions, the sugar may be preground or the mixture of sugar and oleaginous material may be ground. In either case, it is desirable to obtain a particle size for the sugar of less than 40 microns. These compositions may suitably comprise from about 32% to about 38% by weight of the oleaginous compositions and from about 62% to about 68% by weight of the ground sugar, based upon the total weight of the ground sugar and oleaginous composition. The percentages of sugar refer to sucrose alone or to mixtures of sucrose with other sugars such as fructose, dextrose, or lactose. Although costs would be higher, 40% by weight or more of the oleaginous composition may be used with coarser sugars during winter months to obtain filler creams having a creamy texture and quick get away. More than about 45 percent oleaginous composition in the cream filler generally causes the cream filler to be too thick or "heavy" when consumed.

Alternative embodiments of the filler cream of this invention include a stiffener ingredient. A desirable stiffener is non-fat milk powder which can be added in an amount between about 3 and about 10 percent based upon the weight of the filler cream. Excessive amounts of non-fat milk powder causes the final texture of the filler cream to have a "gritty" feel on the tongue of a consumer. The absence of a stiffener does not adversely affect the quick get away properties of the filler cream. A filler cream made without a stiffener has the tendency to melt at near room temperature after prolonged periods of storage. Lecithin can also be used as a processing aid to improve flow properties of the slurry. Dextrose and/or edible fused silica can be used in amounts up to about 10 percent by weight as a stabilizer for the filler cream, based upon the weight of the filler cream. In amounts above about 5 percent, dextrose tends to impart a cooling sensation to the filler cream during consumption.

Various flavorings can be added to the filler cream composition. Suitable amounts range up to about 1 part by weight of flavoring, based upon the weight of the filler cream. Typical flavorings which can be used are vanilla, chocolate, coffee, and pepperment. Numerous suitable flavorings and extracts are commercially available. Vanilla is the preferred flavoring.

Sugar or sucrose is the primary ingredient of a filler cream made according to this invention. The sugar is sifted into the oleaginous composition before air sparging, mixing, and cooling. Commercially available sugars, such as fine granulated table sugar, or 4X, 6X, 10X, or 12X sugars or mixtures of sugars may be used in the present invention. However, grinding of coarse sugars to a finer particle size is more economical than the use of 10X or finer sugars. The finer or powdered sugars tend to densify and agglomerate upon storage prior to incorporation into the filler. Grinding to a particle size of less than 40 microns, results in non-gritty and significantly smoother filler cream textures, particularly when the filler composition contains from about 33% to about 38% of the oleaginous composition, based upon the total weight of the oleaginous composition and sugar.

The base cakes or cookie pieces used with a filler cream, according to this invention, need not be made from any special formulas. A soft base cake breaks apart more easily when eaten by a consumer. A hard base cake tends to resist breakage and can cause a filler cream to be squeezed out of the sides of a sandwich cookie. The firmness of the filler creams made with soybean oil according to this invention is sufficient to resist being squeezed out from between the base cakes when a cookie is eaten.

With some base cakes an oil migration from the filler cream into the cake can occur during prolonged storage. This problem can be reduced or eliminated by altering the base cake formula to include less shortening or oil. After manufacturing the cookies the oil from the filler cream migrates into the base cakes to produce an acceptable oil concentration in the base cakes. This migration occurs over a period of a few days or weeks. Alternatively, a film coating or wax coating can be applied to the layer of a base cake that receives the filler cream. These coatings act as a barrier to the oil migrating from the filler cream.

The following examples further illustrate the present invention. All percentages and parts are by weight and all temperatures are in degrees F. unless otherwise indicated.

EXAMPLE I

A filler cream may be prepared from the following ingredients and their relative amounts.

| INGREDIENTS | QUANTITY | |
|---|---|---|
| | lbs. | ozs. |
| Sugar 6X | 137 | 0 |
| Oleaginous Composition | 100 | 0 |
| Vanilla | 0 | 0.9 |

The oleaginous composition may be a mixture of 50% by weight soybean oil and 50% by weight palm kernel oil. The composition may have an SFI of 49% of 50 degrees F., 29% at 70 degrees F., 12% at 80 degrees F., 2.5% at 92 degrees F., and 0% solids at 104 degrees F. The oleaginous composition may then be heated to 110 degrees F. with mixing. Vanilla flavor can be added to the heated oils. The 6X powdered sugar may be sifted and added slowly to the mixture with continued mixing. The resulting slurry may have a temperature of between about 95 degrees F. and about 100 degrees F. and a specific gravity of about 1.20.

Upon suspension of the sugar in the oleaginous composition, air sparging begins in conjunction with rapid, simultaneous mixing and cooling of the composition to below 75 degrees F. The air sparging and mixing continue until the filler cream obtains a specific gravity of 0.90. The aerating, mixing, and cooling may be performed in a Votator icing mixing machine made by Anco Votator Division, Cherry Berrell Corporation, Louisville, Ky. The filler cream may then be transported to a temperature controlled sandwich unit that applies the filler cream to base cakes on a commercial sandwich cooking manufacturing line.

EXAMPLE II

The ingredients and amounts which may be used to prepare a filler cream can be:

| Ingredients | Quantity | |
|---|---|---|
| | lbs. | ozs. |
| Sugar 6X | 127 | 0 |
| Oleaginous Composition of Example I | 100 | 0 |
| Non-fat dry milk | 10 | 0 |
| Vanilla | 0 | 0.9 |

The filler cream may be prepared as in Example I except the non-fat dry milk is added with the vanilla to the heated oils.

EXAMPLE III

The ingredients and their relative amounts which may be used to prepare a filler cream can be:

| Ingredients | Quantity | |
|---|---|---|
| | lbs. | ozs. |
| Sugar 6X | 117 | 0 |
| Soybean oil | 45 | 0 |
| Palm kernel oil | 55 | 0 |
| Dextrose | 20 | 0 |
| Vanilla | 0 | 0.9 |

The soybean oil and the palm kernel oil may be formulated to provide an oleaginous composition having an SFI as in Example I. The filler cream may be prepared as in Example I except the dextrose is added with the vanilla to the hot oils.

EXAMPLE IV

A filler cream may be prepared with a more finely granulated sugar to obtain a firmer but creamier or less gritty mouthfeel than the filler of Example I. The procedure used may be the same as that used in Example I. The ingredients and their relative amounts may be:

| Ingredients | Quantity | |
|---|---|---|
| | lbs. | ozs. |
| Sugar 10X | 137 | 0 |
| Soybean oil | 50 | 0 |
| Palm kernel oil | 25 | 0 |
| Coconut oil | 25 | 0 |

The soybean oil, palm kernel oil, and coconut oil may be formulated to provide an oleaginous composition having an SFI as in Example I.

EXAMPLE V

A filler cream may be prepared using the procedure of Example I except the ingredients and their relative amounts may be:

| Ingredients | Parts by Weight |
|---|---|
| Preground sugar (less than 40 microns) | 66 |
| Oleaginous Composition of Example I | 34 |
| Vanilla | 0.02 |

The preground sugar may be prepared by grinding a commercially available fine granulated table sugar.

What is claimed is:

1. A filler cream for producing sandwich cookies wherein the filler cream is a laminate separating two cookie base cakes, said cream comprising:
    (a) an oleaginous composition containing soybean oil, the oleaginous composition having a solid fat index of:
        (i) about 46 to about 52 percent solid at 50° F.,
        (ii) about 26 to about 33 percent solid at 70° F.,
        (iii) about 9 to about 15 percent solid at 80° F.,
        (iv) up to 5 percent solid at 92° F., and
        (v) 0 percent solid at 104° F., and
    (b) a sugar mixed into said oleaginous composition, said filler cream having a specific gravity of between about 0.85 and about 0.95, and having a creamy, non-gritty texture and quick get-away characteristics while being sufficiently firm to resist being squeezed out from between said base cakes upon eating.

2. The filler cream of claim 1 wherein said soybean oil is from 45 to 55 percent of said oleaginous composition by weight.

3. The filler cream of claim 2 wherein a palm kernel oil is from 55 to 45 percent of said oleaginous composition.

4. The filler cream of claim 1 wherein said oleaginous composition is about 32% by weight to about 38% by weight, based upon the total weight of the sugar and oleaginous composition.

5. The filler cream of claim 4 wherein said sugar has a particle size of less than about 40 microns.

6. A sandwich cookie comprising said filler cream of claim 5 as a laminate separating two cookie base cakes.

7. A process for making a filler cream for producing sandwich cookies wherein the filler cream remains firm upon storage and is a laminate separating two cookie base cakes, said process comprising:
(a) heating an oleaginous composition containing soybean oil, the oleaginous composition having a solid fat index of:
   (i) about 46 to about 52 percent solid at 50° F.,
   (ii) about 26 to about 33 percent solid at 70° F.,
   (iii) about 9 to about 15 percent solid at 80° F.,
   (iv) up to 5 percent solid at 92° F., and
   (v) 0 percent solid at 104° F.,
(b) blending a sugar and said oleaginous composition to form a slurry, and
(c) aerating and mixing said slurry with simultaneous cooling to a temperature below about 78° F. to form a filler cream having a specific gravity of between about 0.85 and about 1.20, a creamy, non-gritty texture and quick get away characteristics while being sufficiently firm to resist being squeezed out from between said base cakes upon eating.

8. A process as claimed in claim 7 wherein the amount of said oleaginous composition is about 32% by weight to about 38% by weight, based upon the total weight of the sugar and oleaginous composition, and said sugar has a particle size of less than about 40 microns.

9. A process as claimed in claim 7 wherein said slurry is subjected to grinding to reduce the particle size of said sugar to less than 40 microns.

10. A process as claimed in claim 8 wherein the aeration provides a filler cream having a specific gravity of between about 0.85 and about 0.95.

11. A process as claimed in claim 7 wherein said soybean oil is from 45 to 55 percent of said oleaginous composition by weight.

* * * * *